(12) United States Patent
Lewis et al.

(10) Patent No.: US 8,896,896 B2
(45) Date of Patent: Nov. 25, 2014

(54) PREPRINTED FORM OVERLAY

(75) Inventors: Harry R. Lewis, Longmont, CO (US); Reinhard H. Hohensee, Boulder, CO (US); David E. Stone, Seal Rock, OR (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 398 days.

(21) Appl. No.: 13/231,002

(22) Filed: Sep. 13, 2011

(65) Prior Publication Data

US 2013/0063738 A1   Mar. 14, 2013

(51) Int. Cl.
  *H04N 1/46*  (2006.01)
  *G06K 9/00*  (2006.01)
  *G09G 5/00*  (2006.01)
  *G09G 5/02*  (2006.01)
  *G06F 3/12*  (2006.01)

(52) U.S. Cl.
  CPC ........... *G06F 3/1208* (2013.01); *G06F 3/1242* (2013.01); *G06F 3/1288* (2013.01)
  USPC ........... 358/540; 358/538; 358/539; 345/205; 345/690; 382/165

(58) Field of Classification Search
  USPC ........................................................ 358/540
  See application file for complete search history.

(56) References Cited

U.S. PATENT DOCUMENTS

| | | | |
|---|---|---|---|
| 4,334,771 A * | 6/1982 | Ryan, Jr. ................. | 355/133 |
| 5,291,243 A * | 3/1994 | Heckman et al. ......... | 399/3 |
| 5,592,683 A * | 1/1997 | Chen et al. .............. | 710/52 |
| 5,715,382 A * | 2/1998 | Herregods et al. ....... | 358/1.18 |
| 5,727,220 A * | 3/1998 | Hohensee et al. ........ | 715/234 |
| 5,949,438 A * | 9/1999 | Cyman et al. ........... | 345/502 |
| 6,067,554 A | 5/2000 | Hohensee | |
| 6,473,892 B1 | 10/2002 | Porter | |
| 7,436,546 B2 * | 10/2008 | Aschenbrenner et al. | 358/1.9 |
| 7,562,294 B1 * | 7/2009 | Buis et al. ................ | 715/243 |
| 7,577,693 B2 * | 8/2009 | Aden et al. ............... | 1/1 |
| 7,880,719 B2 * | 2/2011 | Kritt et al. ................ | 345/156 |
| 7,944,593 B2 * | 5/2011 | Aschenbrenner et al. | 358/518 |
| 8,477,377 B2 * | 7/2013 | Stanich et al. ........... | 358/2.1 |
| 2002/0149546 A1 | 10/2002 | Ben-Chorin et al. | |
| 2002/0167497 A1 * | 11/2002 | Hoekstra et al. ......... | 345/179 |
| 2002/0171871 A1 | 11/2002 | Catt et al. | |
| 2003/0158775 A1 * | 8/2003 | Chaum .................... | 705/12 |
| 2003/0234954 A1 * | 12/2003 | Hohensee et al. ........ | 358/1.15 |
| 2004/0120011 A1 | 6/2004 | Double | |

(Continued)

FOREIGN PATENT DOCUMENTS

EP   0349455 A3   1/1990

OTHER PUBLICATIONS

"PCT Search Report and Written Opinion", PCT/US12/27741, 7 pages, Jun. 11, 2012.

(Continued)

*Primary Examiner* — Madelein A Nguyen

(74) *Attorney, Agent, or Firm* — Blakely, Sokoloff, Taylor & Zafman LLP

(57) ABSTRACT

A method is disclosed. The method includes simulating a preprinted form using a presentation overlay. The presentation device is directed to present the overlay as if it had been preprinted on the paper. Document data is then mixed with the simulated preprinted form such that the result accurately simulates a real preprinted form.

18 Claims, 4 Drawing Sheets

(56) References Cited

U.S. PATENT DOCUMENTS

| | | |
|---|---|---|
| 2004/0130751 A1 | 7/2004 | Hirtenreiter et al. |
| 2005/0094207 A1 | 5/2005 | Lo |
| 2005/0213139 A1 | 9/2005 | Mach |
| 2005/0216856 A1* | 9/2005 | Matti ............................ 715/768 |
| 2005/0230965 A1* | 10/2005 | Field .............................. 283/92 |
| 2005/0243374 A1* | 11/2005 | Nishide et al. ................. 358/2.1 |
| 2005/0248787 A1* | 11/2005 | Aschenbrenner et al. ..... 358/1.9 |
| 2005/0280847 A1* | 12/2005 | Cairns et al. ................... 358/1.9 |
| 2008/0130049 A1* | 6/2008 | Tsai ............................... 358/1.15 |
| 2009/0110270 A1 | 4/2009 | Poor |
| 2009/0147019 A1 | 6/2009 | Yao |
| 2009/0201522 A1* | 8/2009 | Iguchi ............................ 358/1.9 |
| 2010/0053673 A1* | 3/2010 | Oba ............................... 358/1.15 |
| 2010/0149588 A1 | 6/2010 | Honda |
| 2010/0153176 A1* | 6/2010 | Sussmeier et al. .............. 705/10 |
| 2010/0202008 A1* | 8/2010 | Aronshtam et al. .......... 358/1.15 |
| 2010/0241952 A1* | 9/2010 | Condon et al. ................ 715/251 |
| 2011/0075195 A1 | 3/2011 | Cain |
| 2011/0204141 A1* | 8/2011 | Jones ............................ 235/380 |
| 2012/0008168 A1* | 1/2012 | Danner ........................ 358/1.15 |
| 2012/0120426 A1* | 5/2012 | Clermont et al. .............. 358/1.9 |
| 2013/0086499 A1* | 4/2013 | Dyor et al. .................... 715/766 |
| 2013/0250322 A1* | 9/2013 | Kawabata et al. .............. 358/1.9 |
| 2014/0043645 A1* | 2/2014 | Stokes et al. ................. 358/1.15 |
| 2014/0168178 A1* | 6/2014 | Maloney et al. .............. 345/179 |

OTHER PUBLICATIONS

Hirohiko, Nakazato, "Ubiquitous Printing Services", *Oki Technical Review*, Apr. 2007/Issue 210 vol. 74 No. 2, (2007), 62-65.

* cited by examiner

| Keyword ID | Parameter Range | Meaning | M/O | Exc |
|---|---|---|---|---|
| X'F2' | X'01' - X'7F' | Medium Overlay Local Identifier | O | X'02' |
| X'D2' | X'01' - X'7F' | Preprinted Form Overlay Local Identifier | O | X'02' |

Figure 2

PMC Structured Field Data

| Offset | Type | Name | Range | Meaning | M/O | Exc |
|--------|------|------|-------|---------|-----|-----|
| 0 | CODE | PMCid | 0-127 | Page Modification Control identifier | M | X'06' |
| 1 | BITS | Flags | | Control flags for PMC<br>Bit 0 =<br>0: normal PMC<br>= 1: Preprinted Form (PFO) PMC<br>Bits 1 - 7: reserved; should be zero | M | X'06' |
| 2 - n | | | | Parameters that define position and orientation of PMC | | |

Figure 4

PREPRINTED FORM OVERLAY

FIELD OF THE INVENTION

The present invention relates to the field of printing, and in particular, to merging print job data with an overlay form.

BACKGROUND

Printers are common peripheral devices attached to computers. A printer allows a computer user to make a hard copy of documents that are created in a variety of applications and programs on a computer. To function properly, a channel of communication is established (e.g., via a network connection) between the printer and the computer to enable the printer to receive commands and information from the host computer. Once a connection is established between a computer and the printer, printing software is implemented at a print server to manage a print job through the complete printing process.

Often, print jobs are produced by combining document data with forms data (e.g. text, graphics and images) that exist on a preprinted medium (e.g., paper). However, preprinted forms are costly and cumbersome. Particularly, printer users struggle with the cost and logistics of specifying, purchasing, storing, moving and controlling large volumes of preprinted forms. The customer environment would become more efficient and lower cost if preprinted forms could be eliminated by substituting blank stock. The conventional method of representing form data as an overlay requires that the form overlay is rendered using the normal print job processing and mixing rules. This may result in a color of the simulated preprinted form being "knocked out" and replaced with a color from the document data, which cannot occur with a real preprinted form.

As a result, a preprinted form overlay is desired, which can be managed and applied without alteration to the document datastream, and which completely simulates the preprinted form.

SUMMARY

In one embodiment, a method is disclosed. The method includes simulating a preprinted form using a presentation overlay.

In a further embodiment, a method includes receiving a presentation overlay simulating a preprinted form, receiving print data, combining the overlay with the print data and printing the combined overlay and print data to a medium.

BRIEF DESCRIPTION OF THE DRAWINGS

Embodiments of the present invention may be understood more fully from the detailed description given below and from the accompanying drawings of various embodiments of the invention. The drawings, however, should not be taken to be limiting, but are for explanation and understanding only.

FIG. 2 illustrates one embodiment of a table describing keywords used to invoke a medium overlay as a preprinted form overlay;

FIG. 4 illustrates one embodiment of a table describing the use of a PMC to invoke a PMC overlay as a preprinted form overlay.

DETAILED DESCRIPTION OF THE INVENTION

A preprinted form overlay is described. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
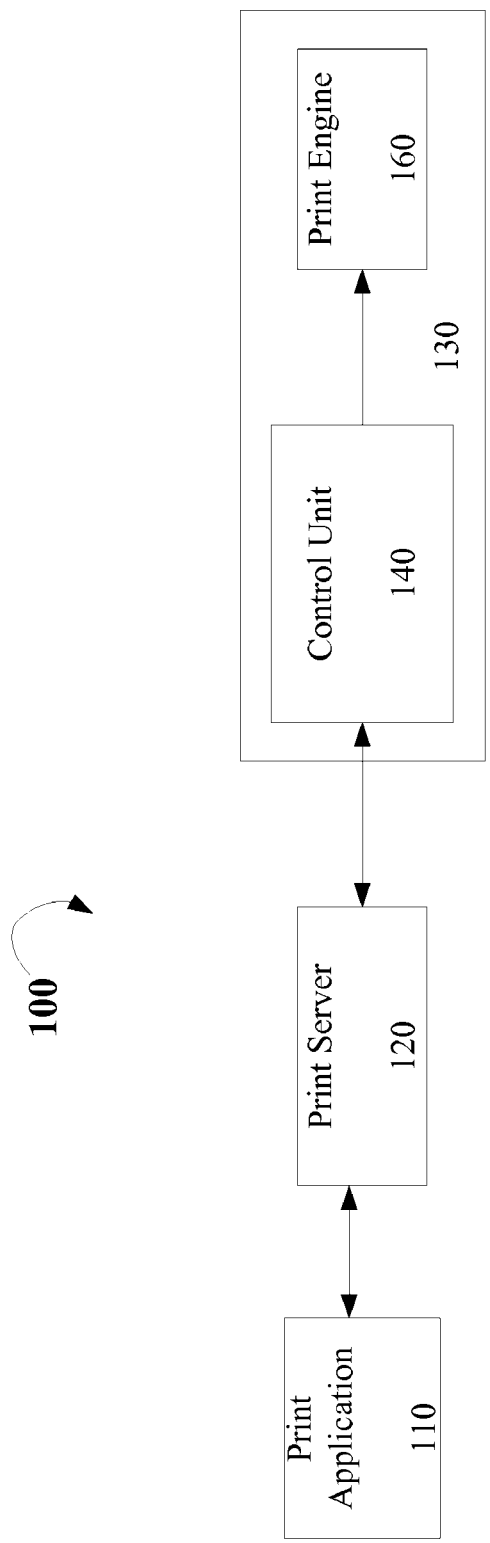
FIG. 1 is a block diagram illustrating one embodiment of a print system.

FIG. 1 illustrates one embodiment of a printing system 100. Printing system 100 includes a print application 110, a server 120 and a printer 130 that are implemented to produce documents generated from print jobs. Print application 110 makes a request for the printing of a document. In one embodiment, print application 110 implements the Advanced Function Presentation (AFP™) architecture. According to the AFP architecture, documents may include combinations of text, image, graphics, and/or bar code objects in device and resolution independent formats. Documents may also include and/or reference fonts, overlays, and other resource objects, which are required at presentation time to present the data properly.

In an AFP embodiment print application 110 provides a Mixed Object Document Content Architecture (MO:DCA) data stream to print server 120. According to one embodiment, the AFP MO:DCA data streams are object-oriented streams including, among other things, data objects, page objects, and resource objects. Print server 120 processes pages of output that mix all of the elements normally found in presentation documents, e.g., text in typographic fonts, electronic forms, graphics, image, lines, boxes, and bar codes. The AFP MO:DCA data stream includes architected, structured fields that describe each of these elements.

In one embodiment, print server 120 communicates with control unit 140 via an Intelligent Printer Data Stream (IPDS). The IPDS data stream is similar to the AFP data steam, but is built specific to the destination printer in order to integrate with each printer's specific capabilities and command set, and to facilitate the interactive dialog between the print server 120 and the printer. The IPDS data stream may be built dynamically at presentation time, e.g., on-the-fly in real time. Thus, the IPDS data stream is provided according to a device-dependent, bi-directional, command/data stream.

Printer 130 includes a control unit 140 and a print head 160. Control unit 140 processes and renders objects received from print server and provides sheet maps for printing to print head 160. Control unit 140 includes a rasterizer to prepare pages for printing. Particularly, rasterizer includes a raster image processor (RIP) that converts text and images into a matrix of pixels (bitmap) that will be printed on a page.

In many instances, print job data processed by printing system 100 is applied to a medium having preprinted forms in order to produce the desired documents. For example, printing system 100 may be implemented to produce statements (e.g., financial, credit card and telephone statements) that include structured data (e.g., corporate graphics, logos, watermarks, etc.). As discussed above, the use of preprinted forms is expensive and inefficient.

According to one embodiment, a preprinted form is simulated using a presentation overlay to simulate a form. Subsequently, transparency and color mixing rules are specified for imaging of ensuing merged data (e.g., medium overlay, page, page overlay or object presentation spaces implemented in AFP).

In one embodiment, a new Preprinted Form Overlay (PFO) is implemented for AFP form simulation. In such an embodiment, PFO is treated like any other AFP Medium Overlay, except that the PFO defines (color) values and behavior that simulates the color of a print medium for any given point, line or region (as if the original media had been preprinted).

In a further embodiment, previously defined MO:DCA presentation space mixing rules and any future semantics defined for treating opacity, transparency or blending are also applied to the PFO with two exceptions: when document data is specified as "color of medium" and the mixing rule is Overpaint (opaque or "knockout" mixing), the resulting color is derived from the PFO color at that region rather than applying the traditional concept of "knockout"; and when the device produces "white" (CMYK=X'00000000' for a printer, RGB=X'FFFFFF' for an RGB display) the same rule as above is applied.

Wherever the document data has color other than color of medium or white, normal AFP mixing rules determine the resultant color. In particular, document data that has color other than color of medium or white will overpaint (knockout) the color of the PFO. In a further embodiment a choice may be made between such knockout of the PFO data and other mixing options.

To implement the PFO in AFP in an environment without n-up, a Medium Modification Control (MMC) is invoked. An MMC structured field specifies the medium modifications to be applied for a copy subgroup specified in the Medium Copy Count structured field. Typically, Keyword X'F2nn' specifies a local ID of a Medium Overlay to be applied to all sheet-sides generated by the copy subgroup. However a new keyword (e.g. X'D2nn') is defined to specify the local ID of the PFO. FIG. 2 illustrates one embodiment of a table describing keywords that would be carried as part of the MMC structured field data for a Medium Overlay and the PFO.

As with other Medium Overlays, the keyword may appear a maximum of eight times in an MMC and the allowed ID range is X'01'-X'7F'. An implementation of the architecture may choose to further restrict the number of PFOs in an MMC to avoid potential issues with overlap. The local ID is mapped to the name of the PFO in a Map Medium Overlay (MMO) structured field. The new X'D2' keyword is specified first in the MMC (before any X'F2' Keywords). Otherwise, an out of sequence PFO will be treated as a regular medium overlay.

The MMC based PFO solution addresses simulation of a full page preprinted form. However, the same requirement must be addressed in the situation where multiple pages are to be printed on one sheet (e.g., n-up). N-up can be addressed using a Page Modification Control (PMC). A PMC structured field specifies modifications to be applied to a page presented on a portion of the medium.

In one embodiment, a PMC overlay identified as a PFO is recognized as simulating a preprinted form. Whenever a PMC overlay is included in this manner all the same concepts apply as defined for the MMC based PFO. FIG. 4 illustrates one embodiment of a table describing the use of a PMC to invoke a PMC overlay as a preprinted form overlay. For example, when document data is specified as "color of medium" and the mixing rule is Overpaint, the resulting color is derived from the PMC-PFO color at that region rather than applying a traditional concept of "knockout". Further, whenever the device produces "white" (CMYK=X'00000000' for a printer, RGB=X'FFFFFF' for an RGB display) the same rule as above is applied. In yet a further embodiment, a PMC-PFO received after any "standard" PMC will be ignored.

Figure 3:
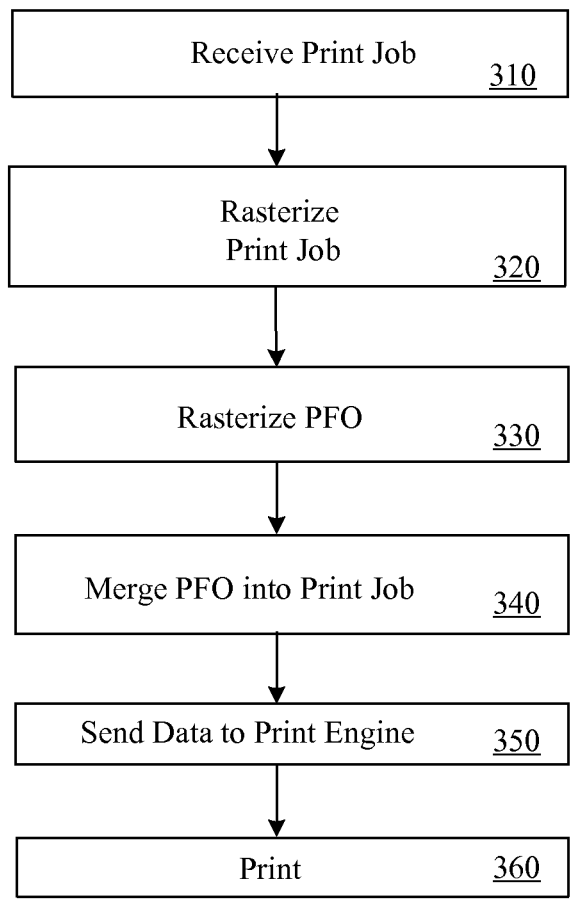
FIG. 3 is a flow diagram for one embodiment of generating a print job with a preprinted form.

FIG. 3 is a flow diagram for one embodiment of generating a print job with a preprinted form. At processing block 310 a print job is received. At processing block 320, the print job is rasterized according to typical print processing. At processing block 330, the preprinted form overlay (e.g., medium overlay PFO or PMC-PFO) layout is rasterized. At processing block 340, preprinted form overlay layout and print job are merged. In one embodiment, the preprinted form overlay is merged on the page presentation before print job data objects are merged. At processing block 350, the merged data is forwarded to print engine 160. At processing block 360, the data is printed.

The above-described mechanism uses a preprinted form overlay (PFO) that preserves the color of medium of the preprinted form, allowing a true simulation of preprinted forms. Thus, the expense and inefficiencies of preprinted forms may be eliminated. Also, in this manner, the simulated preprinted form may undergo modification totally separate from the core document datastream and without the need for subsequent pre-flight impositioning.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow.

What is claimed:

1. A method comprising simulating a preprinted form using an Advanced Function Presentation (AFP) preprinted form overlay (PFO) that is identified to the presentation device for use as a simulated preprinted form, wherein the PFO defines values to simulate color of a print medium for one or more regions of a page.

2. The method of claim 1, further comprising specifying transparency and color mixing rules for imaging data to be merged with the overlay such that document data specified as "color of medium" or device produced "white" (CMYK=X'00000000' for a printer, RGB=X'FFFFFF' for an RGB display) will not affect the color of the preprinted form overlay at that location on the page.

3. The method of claim 1 wherein the presentation overlay used for simulating a preprinted form may undergo modification separate from the core document datastream and without the need for subsequent pre-flight impositioning.

4. The method of claim 1, wherein the PFO overlay is invoked in a Medium Modification Control (MMC).

5. The method of claim 4, wherein the PFO is provided as part of a revisable job ticket (AFP Form Definition or Form Map).

6. The method of claim 1, wherein the PFO overlay is invoked in a Page Modification Control (PMC).

7. A method comprising:
   receiving an Advanced Function Presentation (AFP) preprinted form overlay (PFO) simulating a preprinted form, wherein the PFO defines values to simulate color of a print medium for one or more regions of a page;
   receiving print data;
   combining the overlay with the print data; and
   printing the combined overlay and print data to a medium.

8. The method of claim 7, wherein the overlay specifies transparency and color mixing rules for imaging the print data to be merged with the overlay.

9. The method of claim 7 wherein the overlay specifies transparency and color mixing rules for imaging the print data to be merged with the overlay such that document data that has the color of medium or white does not knockout the overlay data.

10. The method of claim 7, where, for document data with color other than color of medium or white, an option is provided between a knockout of the PFO data and other mixing rules.

11. The method of claim 7, wherein the PFO is invoked in a Medium Modification Control (MMC).

12. The method of claim 7, wherein the PFO is invoked in a Page Modification Control (PMC).

13. The method of claim 7, wherein the PFO is provided as part of revisable job ticket (AFP Form Definition or Form Map).

14. An article of manufacture comprising a machine-readable medium including data that, when accessed by a machine, cause the machine to perform operations comprising simulating an Advanced Function Presentation (AFP) preprinted form using a preprinted form overlay (PFO), wherein the PFO defines values to simulate color of a print medium for one or more regions of a page.

15. The article of manufacture of claim 14 comprising a machine-readable medium including data that, when accessed by a machine, further cause the machine to perform operations comprising specifying transparency and color mixing rules for imaging data to be merged with the overlay.

16. The article of manufacture of claim 14 comprising a machine-readable medium including data that, when accessed by a machine, further enables the machine to provide an option between a knockout of the PFO data and other mixing rules.

17. The article of manufacture of claim 16, wherein the PFO invoked in a Medium Modification Control (MMC).

18. The article of manufacture of claim 16, wherein the PFO invoked in a Page Modification Control (PMC).

* * * * *